United States Patent [19]

Lindner et al.

[11] Patent Number: 4,518,743

[45] Date of Patent: May 21, 1985

[54] MOULDING COMPOSITIONS OF VINYL CHLORIDE POLYMERS, CERTAIN COPOLYMERS AND POLYMERIC PLASTICISERS HAVING A HIGH RESISTANCE TO AGEING

[75] Inventors: Christian Lindner, Cologne; Karl-Heinz Ott; Walter Uerdingen, both of Leverkusen; Hans-Eberhard Braese, Cologne; Helmut Hurnik, Leverkusen, all of Fed. Rep. of Germany

[73] Assignee: Bayer Aktiengesellschaft, Leverkusen, Fed. Rep. of Germany

[21] Appl. No.: 516,634

[22] Filed: Jul. 25, 1983

[30] Foreign Application Priority Data

Aug. 4, 1982 [DE] Fed. Rep. of Germany ....... 3229131

[51] Int. Cl.$^3$ ..................... C08L 27/06; C08L 31/04; C08L 32/20; C08L 55/02
[52] U.S. Cl. ........................................ 525/80; 525/78; 525/79; 525/83; 525/84
[58] Field of Search .................. 525/80, 83, 81, 87, 525/82, 84, 78, 79

[56] References Cited

U.S. PATENT DOCUMENTS

| | | | |
|---|---|---|---|
| 3,772,409 | 11/1973 | Scarso | 525/80 |
| 3,899,547 | 8/1975 | Amagi et al. | 525/83 |
| 4,173,598 | 11/1979 | Castelazo et al. | 525/80 |
| 4,337,324 | 6/1982 | Yusa et al. | 525/80 |
| 4,362,845 | 12/1982 | Kamata et al. | 525/83 |
| 4,431,772 | 2/1984 | Katto et al. | 525/78 |
| 4,456,733 | 6/1984 | Hornbaker | 525/78 |

FOREIGN PATENT DOCUMENTS

| | | | |
|---|---|---|---|
| 0043512 | 1/1982 | European Pat. Off. | 525/80 |
| 2008674 | 1/1970 | France . | |
| 2011501 | 3/1970 | France . | |
| 932852 | 7/1963 | United Kingdom | 525/83 |
| 944383 | 12/1963 | United Kingdom | 525/80 |
| 1205911 | 9/1970 | United Kingdom | 525/83 |
| 1234135 | 6/1971 | United Kingdom . | |

Primary Examiner—Allan M. Lieberman
Attorney, Agent, or Firm—Connolly and Hutz

[57] ABSTRACT

This invention relates to thermoplastic moulding compositions of vinyl chloride polymers, certain ABS-copolymers, certain resin-like copolymers, certain acrylate copolymers and, optionally, diene copolymers for the production of films having improved resistance to ageing.

6 Claims, No Drawings

MOULDING COMPOSITIONS OF VINYL CHLORIDE POLYMERS, CERTAIN COPOLYMERS AND POLYMERIC PLASTICISERS HAVING A HIGH RESISTANCE TO AGEING

This invention relates to thermoplastic moulding compositions of vinyl chloride polymers, certain ABS-copolymers, certain resin-like copolymers, certain acrylate copolymers and, optionally, diene copolymers for the production of films having improved resistance to ageing.

Vinyl chloride polymers, particularly polyvinyl chloride (PVC), are widely used starting materials for the production of a variety of plastics articles. It is known that the characteristic property spectrum of vinyl chloride polymers may be varied or modified within wide limits by combination with other substances. Thus, unmodified or only slightly modified PVC moulding compositions (so-called "rigid PVC"), for example, are suitable for the production of mouldings. They show average processing properties, average dimensional stability to heat, moderate toughness and relatively poor flexibility.

By combining polyvinyl chloride, for example, with so-called plasticisers of low or medium molecular weight, it is possible to produce plastics articles ("flexible PVC") which show high flexibility and elasticity at the use temperatures thereof. The plasticisers used incude, for example, phthalates, epoxide compounds, aliphatic diesters, phosphates, polyesters having molecular weights of up to 3000, trimellitates, citrates or certain aliphatic, optionally chlorinated hydrocarbons. These plasticisers are known (cf., for example, "Encyclopedia of PVC", Mariel Dekker, Inc. New York, 1976).

In addition, combinations of so-called polymeric plasticisers (polymers of relatively high molecular weight) with vinyl chloride polymers may be used for the production of flexible PVC mouldings having improved mechanical properties, for example improved abrasion resistance, elasticity, solvent resistance and, optionally better flame resistance.

Polymeric plasticisers of the type in question are, for example, partially cross-linked butadiene/acrylonitrile copolymers containing up to 30% by weight of acrylonitrile and having Mooney viscosities (ML 4, 100° C. (DIN 53523)) of from 60 to 100 (cf., for example, EP 0 005 736), certain polyurethanes (German Pat. No. 1,193,241) and certain ethylene/vinyl acetate copolymers soluble in organic solvents (cf., for example, EP 0 005 736).

Plastics blends of high notched impact strength may be obtained by combining vinyl chloride polymers, for example, with graft polymers (for example styrene, α-methyl styrene, acrylonitrile and/or methyl methacrylate grafted onto rubber-like substrates, such as butadiene polymers or acrylate rubbers) or with graft copolymers (vinyl chloride grafted onto certain ethylene/vinyl acetate copolymers containing, for example, 45% by weight of vinyl acetate and 55% by weight of ethylene) or with other polyethylene derivatives.

The rubber components of the graft polymer modifiers are preferably of a different character (compared with some of the polymeric plasticisers mentioned above) from the rubbers which may be used as polymeric plasticisers. These differences may be attributable, for example, to chemical composition, to cross-linking characteristics, to particle morphology and to the grafting characteristic.

In addition, the thermal stability under load of vinyl chloride polymers may be improved by certain modifiers, such as copolymers of styrene, α-methyl styrene, acrylonitrile and methyl methacrylate.

To enable these various polymer combinations to be processed on a commercial scale, the systems have to be effectively stabilised, for example against thermal, photolytic and chemical degradation.

Suitable stabilisers and processing aids are, for example, (Ba/Cd-, Pb-, Sn- and Zn-stabilisers or organic stabilisers and also phenolic, optionally S- or P-containing oxidation inhibitors, epoxide compounds, waxes, low molecular weight and high molecular weight lubricants. Additives which optimise the processing conditions of the particular system are also necessary. Such auxiliaries and the processing conditions are described, for example, in "Kunststoff Handbuch" Carl Hanser Verlag, Munich (1963).

Specialised applications (for example as laminating films) call for compositions containing vinyl chloride polymers which are capable of meeting specific demands: a combination of toughness, break resistance, flexibility, elasticity (even at relatively low temperatures), thermal stability under load, abrasion resistance, bond strength; an ability to be processed to form sheet-like materials by extrusion, calendering, injection moulding, deep drawing; laminatability with other materials. In addition, the compositions are required to show high resistance to migration, dimensional stability and particular shrinkage properties. They are also required to have an aesthetic surface appearance and to be able to be processed by specialised surface treatment techniques to form articles having a decorative appearance. In addition, materials of the type in question should have a comfortable feel.

This complex set of requirements may be satisfied by subjecting the following composition, for example, to thermoplastic processing in certain quantitative ratios:
vinyl chloride polymer (for example PVC) low molecular weight plasticiser (for example dioctyl adipate or phthalates),
graft polymers (for example ABS-graft polymers), polymeric plasticisers (for example butadiene/acrylonitrile rubber) and a complex range of stabilisers for the various components and for the mixture as a whole.

Polymer compositions of this type have disadvantages in terms of practical application which limit the scope of application of mouldings produced therefrom (for example as films). The disadvantages in question are, for example, inadequate resistance to the ageing effects of light, heat, chemicals, other foreign media and also possible chemical interactions between the various components. The resulting ageing is reflected in a loss of mechanical and visual properties (for example embrittlement, colour deterioration and exudation).

It has now been found that films having improved resistance to ageing may be produced from certain thermoplastic moulding compositions which satisfy the complex set of performance requirements mentioned above.

Accordingly, the present invention relates to thermoplastic moulding compositions containing:
(A) from 25 to 50 parts, by weight, of a vinyl chloride homo- or co-polymer;

(B) from 25 to 50 parts, by weight, of an ABS-polymer produced by the graft polymerisation of:
  (1) from 30 to 95 parts, by weight, of a monomer mixture of styrene, methyl methacrylate or α-methyl styrene, either individually or in admixture, on the one hand, and acrylonitrile, on the other hand, in a weight ratio of from 90:10 to 60:40; onto
  (2) from 70 to 5 parts, by weight, of a butadiene homo- or co-polymer containing ≦35%, by weight, of comonomer and having a gel content of ≧50%;
  (3) the resulting grafted rubber having an average particle size of from 0.05 to 5μ;
(C) from 0 to 10 parts, by weight, of a resin-like, thermoplastic copolymer of a styrene/acrylonitrile or methyl methacrylate/acrylonitrile copolymer which has a Staudinger index ($\eta$) of ≧3 (dl/g), preferably ≧4 (dl/g), and of which the ($\eta$)-value is in any case higher than that of the copolymer present in the basic polymer (B);
(D) from 5 to 40 parts, by weight, of a copolymer of
  (1) from 10 to 99.9 parts, by weight, of an acrylic ester of a $C_1$–$C_{15}$ alcohol;
  (2) from 0 to 90 parts, by weight, of at least one polyfunctional monomer containing double bonds in the molecule; and, optionally,
  (3) up to 40%, by weight, based on the sum of (1) and (2), of one or more other comonomers, such as acrylonitrile vinyl acetate and/or methacrylic acid alkyl esters derived from $C_1$–$C_8$ alcohols;
  the copolymer being uncross-linked or partially cross-linked and the copolymer or the uncross-linked parts thereof having average molecular weights of from 1000 to 2,000,000; and
(E) from 3 to 30 parts, by weight, of a copolymer produced from:
  (1) from 60 to 95 parts, by weight, of a monomer containing 2 conjugated olefinic double bonds and/or an acrylic ester of $C_1$–$C_6$ alcohol;
  (2) from 5 to 40 parts, by weight, of styrene and/or acrylonitrile and/or methacrylic acid methyl ester; optionally
  (3) up to 10 parts, by weight, of a cross-linking polyfunctional monomer or polymer containing double bonds; and (4) up to 30 parts, by weight, of one or more other comonomers, such as vinyl ether;
component (E) being different from component (D) and the copolymer (E) having a gel content of ≧70%.

Component (A) preferably contains at least 50%, by weight of vinyl chloride.

The (butadiene) copolymer of component (E) preferably contains ≦35%, by weight, of comonomer and has a gel content of ≧50%.

The Staudinger index of component (C) is measured in dimethyl formamide at 25° C.

Differentiating parameters for component (E) are, for example, chemical composition, cross-linking or gel content.

Preferred moulding compositions contain from 25 to 50 parts, by weight, of component (A); from 25 to 50 parts, by weight, of component (B); from 1.5 to 3 parts, by weight, of component (C); from 15 to 35 parts, by weight, of component (D); and from 5 to 20 parts, by weight, of component (E).

Vinyl chloride polymers (component (A)) in the context of the present invention are preferably polyvinyl chloride (PVC), copolymers of vinyl chloride with up to 50%, by weight, preferably up to 20%, by weight, of one or more copolymerisable compounds and also graft polymers of vinyl chloride on ethylene/vinyl acetate copolymers (preferably having vinyl acetate contents of ≦50%, by weight).

Compounds copolymerisable with vinyl chloride are, for example, vinyl esters of carboxylic acids containing from 1 to 8 carbon atoms in the alkyl moiety, such as vinyl acetate, vinyl propionate, alkyl acrylates, alkyl methacrylates, alkyl vinyl ethers, propylene, maleic acid anhydride, semi- and di-esters of maleic acid with aliphatic alcohols containing from 1 to 8 carbon atoms in the alcohol moiety.

ABS-polymers in the context of the present invention are preferably graft products obtained by the graft polymerisation of:
  (1) from 30 to 95 parts, by weight, preferably from 60 to 95 parts, by weight, of a monomer mixture of styrene, methyl methacrylate or α-methyl styrene, either individually or in admixture, and acrylonitrile in a weight ratio of from 90:10 to 60:40, preferably from 75:25 to 65:35, (monomer mixtures containing no methyl methacrylate are particularly preferred); onto
  (2) from 70 to 5 parts, by weight, preferably from 5 to 40 parts, by weight, of a butadiene homo- or co-polymer containing ≦35%, by weight, of comonomer and having a gel content of ≧50%, preferably ≧80%, the actual graft rubber having an average particle size of from 0.05 to 5μ, preferably from 0.1 to 0.5μ, ($d_{50}$-values). ABS-graft products on highly cross-linked butadiene homopolymers having a particle size of from 0.3 to 0.5μ are particularly preferred.

Resin-like thermoplastic copolymers (c) in the context of the present invention are styrene/acrylonitrile copolymers or methyl methacrylate/acrylonitrile copolymers which have a Staudinger index [$\eta$] of ≧3 (dl/g), preferably ≧4 (dl/g). The Staudinger indices of this thermoplastic component are higher than the Staudinger indices of the copolymers present in the basic polymer (B), i.e. the resin components present in the ABS graft copolymer.

Methyl methacrylate/acrylonitrile copolymers containing from 5 to 50%, by weight, of incorporated acrylonitrile are preferably used as component (C), with particularly preferred polymers (C) consisting of from 15 to 40%, by weight, of acrylonitrile and from 85 to 60%, by weight, of methyl methacrylate. They have an uncross-linked structure (as reflected in the solubility thereof in suitable organic solvents, for example dimethyl formamide). These copolymers may optionally contain relatively small amounts of methacrylic acid esters of $C_2$–$C_8$ alcohols and acrylic acid esters of $C_1$–$C_6$ alcohols.

Component (D) of the compositions according to the present invention preferably comprises copolymers of:
(D)
  (1) from 10 to 99 parts, by weight, preferably from 70 to 99.9 parts, by weight, of an acrylic ester of a $C_1$–$C_{15}$ alcohol, such as butyl acrylate, hexyl acrylate, methyl acrylate and ethyl acrylate, butyl acrylate or ethyl hexyl acrylate being particularly preferred;
(D)
  (2) from 0 to 90 parts, by weight, preferably from 0.1 to 30 parts, by weight, of at least one polyfunctional monomer containing double bonds in the molecule, such as divinyl benzene, alkylene di(- meth)acrylate; triallyl (iso)cyanurate, butadiene, isoprene and allyl (meth)acrylate; and, optionally, (D)
(3) up to 40%, by weight, more particularly up to 30%, by weight, based on the sum of (D)(1) and (D)(2), of one or more other comonomers, such as acrylonitrile, vinyl acetate and/or methacrylic acid alkyl esters of $C_1$–$C_8$ alcohols, preferably methyl methacrylate.

All the copolymers (D) may be uncross-linked or partially cross-linked; the soluble copolymers have molecular weights of from 1000 to 2,000,000, preferably $\geq$20,000. Particularly preferred copolymers (D) are copolymers consisting of from 15 to 35 parts, by weight, of acrylonitrile, optionally in admixture with ethyl hexyl acrylate, and from 0.1 to 10 parts, by weight, of polyfunctional monomers. These products are preferably partially cross-linked and have gel contents of $\geq$30% and swelling indices (as measured in dimethyl formamide) of from 10 to 60, preferably from 15 to 60, more preferably from 15 to 40.

Component (E) of the compositions according to the present invention preferably comprises copolymers produced from:

(E)
(1) from 60 to 95 parts, by weight, preferably from 65 to 85 parts, by weight, of a monomer containing conjugated olefinic double bonds, for example butadiene, isoprene or chloroprene, and/or of an acrylic ester of a $C_1$–$C_6$ alcohol, for example ethyl, butyl or hexyl acrylate;

(E)
(2) from 5 to 40 parts, by weight, preferably from 15 to 35 parts, by weight of styrene and/or acrylonitrile and/or methacrylic acid methyl ester; optionally (E)
(3) up to 10 parts, by weight, of a cross-linking polyfunctional monomer or oligomer or polymer containing double bonds; and (E)
(4) up to 30 parts, by weight, of other monomers, such as vinyl acetate, (meth)acrylic acid, vinyl ethers, methoxy methacrylamide, preferably vinyl acetate; the copolymers in question should have gel contents of $\geq$70% and should differ from copolymer (D) in at least one parameter, for example chemical composition, cross-linking, gel content, swelling index.

Preferred copolymers are copolymers of from 20 to 35 parts, by weight, of acrylonitrile, from 80 to 65 parts, by weight, of butadiene having gel contents of $\geq$70% or copolymers of from 15 to 35 parts, by weight, of acrylonitrile, from 85 to 65 parts, by weight, of acrylic acid alkyl ester and from 0.4 to 10 parts, by weight, of a cross-linking agent (e.g. polyfunctional vinyl or allyl monomers, such as butadiene, isoprene, diene oligomers, polydienes, $C_2$–$C_{30}$ alkylenes containing terminal polymerisable groups (preferably from the series of (meth)acrylic acid esters)) or even polybutadiene nuclei in cross-linked form onto which alkyl acrylate has been grafted in admixture with acrylo-nitrile. These preferred copolymers may contain incorporated vinyl acetate.

Component (E) should differ from component (D) in at least one parameter. The different effect of components (E) and (D) in the composition according to the present invention may be obtained by the chemical composition and by the degree of cross-linking (or non-cross-linking) as expressed by gel content, swelling index and molecular weight of the soluble portion.

Where components (D) and (E) are present in cross-linked, particulate form, particle size is also an important factor in certain product compositions, for example for the effect of component (E).

Components (D) and (E) of the moulding compositions according to the present invention may also be used for producing the present moulding compositions when they are in the form of cetain graft polymers (graft polymers of the vinyl chloride polymers forming component (A) on polymers (D) and (E) as the graft base).

The vinyl chloride polymers suitable for use in accordance with the present invention may be produced by known methods, for example by emulsion, suspension or mass polymerisation.

The ABS-polymers suitable for use in accordance with the present invention may be produced by emulsion, suspension or precipitation polymerisation. Particularly suitable processes are emulsion and suspension polymerisation. Particularly preferred ABS-polymers are obtained by initially polymerising a butadiene (copolymer) rubber in aqueous emulsion (in the presence of emulsifiers, radical-formers, regulators) to form an aqueous latex having a latex particle size of from 0.05 to 5$\mu$ (optionally in combination with known latex particle agglomeration processes) and polymerising the vinyl monomers mentioned in the presence of this rubber latex in a second stage.

Stabilisers (for example of the phenol type) may be added on completion of these graft polymerisation reactions.

The polymers may be isolated by known methods, for example by coagulation using electrolytes or solvents. The polymers may be freed from water by drying.

The thermoplastic additives (C) used in accordance with the present invention may be produced by emulsion or suspension polymerisation processes in the presence of known surface-active substances and initiators (for example radical-formers). The polymers obtained may either be isolated from the latex accumulating (for example by spray drying or by coagulation using an electrolyte) or alternatively the latices accumulating are mixed and coagulated together with other latices of the components according to the present invention.

Such so-called "co-coagulation processes" lead to mixtures of components which give moulding compositions having particularly desirable properties (for example improved processibility of the components according to the present invention).

Component (D) of the compositions according to the present invention may be produced in known manner by radical copolymerisation processes, for example by emulsion, solution, mass or suspension polymerisation and by combination of emulsion and suspension polymerisation. Emulsion polymerisation is particularly preferred. The polymers may be isolated by known methods after production.

As with the other components of the moulding compositions according to the present invention, the individual components may be treated and stabilised during or after production using conventional oxidation inhibitors, heat stabilisers or light stabilisers.

Component (E) is produced in such a way that the material may be cross-linked to gel contents of $\geq$70%.

Accordingly, one preferred method of producing component (E) is emulsion polymerisation, preferably in aqueous media. Other suitable methods of production include, for example, solution polymerisation which results in the formation of a substantially uncross-linked material. The necessary cross-linking is then brought about by the action of cross-linking agents with or without dispersion of the precondensate obtained by solution polymerisation. In such processes, it is possible to use conventional radical-formers and also suitable light sources. One particularly suitable process is aqueous emulsion polymerisation, followed by coagulation of the aqueous latices obtained.

The moulding compositions according to the present invention may be processed by the methods normally used for processing plastics, such as injection moulding, extrusion, blow forming, deep drawing, calendering. Although it is possible to produce various mouldings, the moulding compositions according to the present invention are particularly suitable for films.

As may be seen from the following Examples, the films obtained from the moulding compositions according to the present invention show considerably improved ageing behaviour when plasticisers of low, medium or high molecular weight are replaced by certain acrylate copolymers in otherwise the same formulation for the moulding compositions according to the present invention.

The fact that this effect was surprising and does not depend solely upon the molecular weight of the plasticising components (D) and (E) is shown by comparing the ageing behaviour of moulding compositions which contain, on the one hand, the acrylate copolymers suitable for use in accordance with the present invention and, on the other hand, conventional plasticisers (for example polyester plasticisers).

A further improvement in ageing behaviour is obtained by replacing the butadiene rubbers (E) by certain cross-linked acrylate rubbers (E).

The intrinsic viscosities (Staudinger indices) were determined in the particular solvent indicated. For definitions of the Staudinger index, swelling index and gel content, see M. Hoggmann, H. Kromer, R. Kuhn, "Polymer-analytik I und II" Georg-Thieme Verlag (Stuttgart), 1977.

The graft rubber particle sizes are $d_{50}$ (diameter)-values, as determined by ultracentrifuge measurements (cf-W. Scholtan, H. Lange, Kolloidz. und Z. Polymere 250 (1972) 783–796).

EXAMPLES

For producing the moulding compositions described in Table 2. x parts, by weight of polyvinyl chloride (K-value 70) are combined with different quantities of different products (Table 1). In each case, 2%, by weight, of Ba/Cd-laurate (solid), 0.3%, by weight, of phenolic oxidation inhibitor (solid) and 0.2%, by weight, of ester wax are added for stabilisation and lubrication. The moulding compositions are homogenised on mixing rolls for 10 minutes at 180° C. and are moulded at 190° C. to form test specimens.

Table 1: Polymers used

Product 1.1: A mixture of 94 parts, by weight, of an ABS-polymer and 6 parts, by weight, of a methyl methacrylate/acrylonitrile copolymer containing 32%, by weight, of acrylonitrile and having a Staudinger index of 5 dl/g (in dimethyl formamide (DMF) at 25° C.); the ABS polymer produced by emulsion polymerisation contains 30%, by weight, of polybutadiene having a gel content of $\geq 70\%$ and a particle size of $0.4\mu$.

Product 1.3: Emulsion polymerisation at 65° C. using the following formulation gives a latex from which a rubber-like polymer is obtained by coagulation with $MgSO_4$:
  2585 parts, by weight, of water
  27 parts, by weight, of Na-$C_{14}$–$C_{16}$ alkyl sulphonate
  2 parts, by weight, of potassium peroxydisulphate
  1182 parts, by weight, of butyl acrylate
  393 parts, by weight, of acrylonitrile
  4 parts, by weight, of triallyl cyanurate.

The polymer has a gel content (in DMF) of 92 and a swelling index of 19.8

Product 1.4: The polymer consists of 29%, by weight, of acrylonitrile and 71%, by weight, of butadiene, is an emulsion polymer and has a gel content of $\geq 60\%$.

Product 1.5: The adipate/carbonate mixed ester was produced by reacting adipic acid/hexane diol/neopentyl glycol polyester diol (MW approx. 2000) with diphenyl carbonate and has a molecular weight of approximately 100,000.

Product 1.6: The polymer consists of 70%, by weight, of vinyl acetate and 30%, by weight, of ethylene and has an average molecular weight of approximately 200,000.

Product 1.2: Emulsion polymerisation at 65° C. using the following formulation gives a latex from which a rubber-like polymer is obtained by coagulation with $MgSO_4$:
  2590 parts, by weight, of water
  35 parts, by weight, of Na-$C_{14}$–$C_{16}$ alkyl sulphonate,
  2 parts, by weight, of potassium peroxydisulphate
  1417 parts, by weight, of butyl acrylate
  158 parts, by weight, of acrylonitrile
  1.0 part, by weight, of triallyl cyanurate.

The polymer has a gel content (in DMF) of 63 and a swelling index of 40.

Product 1.7: Emulsion polymersation at 65° C. using the following formulation gives a latex from which a rubber like-polymer is obtained by coagulation with $MgSO_4$:
  2590 parts, by weight, of water
  25 parts, by weight of Na-$C_{14}$–$C_{16}$ alkyl sulphonate
  2 parts, by weight, of potassium peroxydisulphate
  1181 parts, by weight, of butyl acrylate,
  300 parts, by weight, of acrylonitrile
  7 parts, by weight, of $NaHCO_3$.

The polymer is soluble in organic solvents and has a Staudinger index (in DMF) of 1.2 dl/g.

TABLE 2

| Example 1 | | Example 2 | | Example 3 | | Example 4 | | Example 5 | | Example 6 | |
|---|---|---|---|---|---|---|---|---|---|---|---|
| Product | PBW* | Product | PBW | Product | PBW | Product | PBW | Product | PBW | Product | PBW |
| PVC | 40 | PVC | 30 | PVC | 30 | PVC | 30 | PVC | 30 | PVC | 30 |
| 1.1 | 35 | 1.1 | 45 | 1.1 | 45 | 1.1 | 45 | 1.1 | 45 | 1.1 | 45 |
| Adipic acid | 18 | 1.2 | 40 | 1.2 | 35 | 1.6 | 30 | 1.5 | 25 | 1.7 | 30 |

TABLE 2-continued

|  | Example 1 Product | Example 1 PBW* | Example 2 Product | Example 2 PBW | Example 3 Product | Example 3 PBW | Example 4 Product | Example 4 PBW | Example 5 Product | Example 5 PBW | Example 6 Product | Example 6 PBW |
|---|---|---|---|---|---|---|---|---|---|---|---|---|
|  | polyester 1.4 | 8 | 1.4 | 10 | 1.3 | 10 | 1.3 | 10 | 1.4 | 10 | 1.3 | 10 |
| Tensile strength MPa, DIN 53455 |  | 19.2 |  | 22.7 |  | 23.1 |  | 24.6 |  | 18.2 |  | 22.0 |
| Elongation % DIN 53455 |  | 182 |  | 312 |  | 285 |  | 296 |  | 118 |  | 300 |
| Vicat value °C. DIN 53460, method A |  | 70 |  | 82 |  | 85 |  | 80 |  | 82 |  | 79 |
| Shore hardness D DIN 53505 |  | 51 |  | 52 |  | 55 |  | 54 |  | 54 |  | 51 |
| Tear propagation resistance N/mm DIN 53515 |  | 63 |  | 65 |  | 65 |  | 73 |  | 80 |  | 66 |
| Elongation % after ageing (120° C., 21d) DIN 53455 |  | 5 |  | 125 |  | 187 |  | 190 |  | 55 |  | 177 |

*Parts, by weight

As may be seen from Examples 1 to 6, moulding compositions 2,3,4 and 6 according to the present invention show similar or improved properties compared with the moulding composition of Example 1. The elongation of the material after ageing tests is considerably increased in the case of the moulding compositions according to the present invention.

We claim:

1. A thermoplastic molding composition comprising (A), (B), (C), (D) and (E) wherein:
   (A) is from 25 to 50 parts, by weight of molding composition, of a vinyl chloride homo- or co-polymer;
   (B) is from 25 to 50 parts, by weight of the molding composition, of an ABS-graft product comprising
      from 30% to 95%, based on the weight of (B), of a monomer mixture of a styrene, methyl methacrylate, α-methyl styrene or combinations thereof, and (b) acrylonitrile, in weight ratio of (a) to (b) of from 90:10 to 60:40; and
      from 70% to 5%, based on the weight of (B), of a butadiene homo- or co-polymer; and where the ABS-graft product has an average particle size of from 0.05 to 5μ;
   (C) is from 0 to 10 parts, by weight of molding composition, of a resin-like, thermoplastic copolymer of acrylonitrile and styrene or methyl methacrylate where component (C) has a Staudinger index value which is greater than or equal to 3 (dl/g) and which is higher than the Staudinger index value of component (B);
   (D) is from 5 to 40 parts, by weight of molding composition, of a copolymer comprising
      from 10% to 99.9% based on the weight of (D), of an acrylic ester of an alcohol containing from one to fifteen carbon atoms;
      from 0% to 90%, based on the weight of (D), of a bifunctional or polyfunctional monomer containing conjugated or unconjugated double bonds; and
      from 0% to 40%, based on the weight of the remainder of (D), of acrylonitrile, vinyl acetate, methacrylic acid alkyl esters of alcohols having one to eight carbon atoms or mixtures thereof, where component (D) is uncrosslinked or partially cross-linked and component (D) or the uncrosslinked parts thereof have an average molecular weight of from 1000 to 2,000,000; and
   (E) is from 3 to 30 parts, by weight of molding composition, of a copolymer comprising
      from 60% to 95%, based on the weight of (E), of a monomer containing 2 conjugated olefinic double bonds or an acrylic ester of an alcohol containing one to six carbon atoms or mixtures thereof and;
      from 5% to 40%, based on (E), of styrene, acrylonitrile, methacrylic acid methyl ester or mixtures thereof; where component (E) has a gel content of greater than or equal to 70% and component (E) is different from component (D).

2. A molding composition as claimed in claim 1, wherein (B) comprises:
   from 60% to 95%, based on the weight of (B), of styrene and acrylonitrile, having a styrene to acrylonitrile weight ratio of from 75:25 to 65:35; and
   from 40% to 5%, based on the weight of B, of a polybutadiene latex or butadiene/styrene copolymer latex having a butadiene to styrene weight ratio of 70:30, an average particle size of from 0.1 to 0.5μ and a gel content of greater than or equal to 50%; and
   (C) comprises from 95% to 50%, based on the weight of (C), of methyl methacrylate and from 5% to 50%, based on the weight of (C), of acrylonitrile.

3. A molding composition as claimed in claim 1, wherein component (D) comprises:
   from 10% to 99.9%, based on the weight of (D), of an acrylic ester of an alcohol containing one to eight carbon atoms;
   from 0% to 10%, based on the weight of (D), of a bifunctional or trifunctional monomer containing conjugated or unconjugated double bonds, and from 5% to 35%, based on the remaining weight of (D), of acrylonitrile, vinyl acetate, methacrylic acid alkyl esters having one to four alkyl carbon atoms or mixtures thereof.

4. A thermoplastic molding composition according to claim 1 wherein copolymer (E) further comprises
- up to 10%, based on the weight of (E), of a cross-linking bi- or poly-functional monomer or a polymer containing conjugated or unconjugated double bonds; and
- up to 30%, based on the weight of (E), of vinyl acetate, acrylic acid, methacrylic acid, vinyl ethers or mixtures thereof.

5. A thermoplastic molding composition as claimed in claim 1 wherein (E) comprises
- at least one copolymer selected from a first copolymer of from 90% to 65%, based on the weight of the first copolymer, butadiene, and from 10% to 35%, based on the weight of the first copolymer, acrylonitrile; and
- a second copolymer of from 60% to 95%, based on the weight of the second copolymer, of acrylic esters of an aliphatic alcohol having from one to six aliphatic carbon atoms, and from 5 to 40 parts, based on the weight of the second copolymer, of acrylonitrile, and from 0% to 25%, based on the weight of copolymer of vinyl acetate.

6. In a process of forming a film from a thermoplastic composition, the improvement which comprises forming the film from a thermoplastic composition in accordance with claim 1.

* * * * *